US010425711B2

(12) United States Patent
Ent et al.

(10) Patent No.: US 10,425,711 B2
(45) Date of Patent: Sep. 24, 2019

(54) ROTATING SPEAKER

(71) Applicant: Lenovo (Singapore) Pte. Ltd., Singapore (SG)

(72) Inventors: Ali Kathryn Ent, Raleigh, NC (US); Cuong Huy Truong, Cary, NC (US); Thomas Perelli, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/390,489

(22) Filed: Dec. 24, 2016

(65) Prior Publication Data

US 2018/0184185 A1  Jun. 28, 2018

(51) Int. Cl.
| H04R 1/02 | (2006.01) |
| G06F 1/16 | (2006.01) |
| E05D 3/12 | (2006.01) |

(52) U.S. Cl.
CPC ............ H04R 1/026 (2013.01); H04R 1/025 (2013.01); *E05D 3/122* (2013.01); *G06F 1/1616* (2013.01); *G06F 1/1681* (2013.01); *H04R 2201/025* (2013.01); *H04R 2420/07* (2013.01); *H04R 2420/09* (2013.01); *H04R 2499/11* (2013.01); *H04R 2499/15* (2013.01)

(58) Field of Classification Search
CPC .. H04R 1/026; H04R 1/025; H04R 2201/025; H04R 2420/07; H04R 2499/11; H04R 2420/09; H04R 2499/15; H02J 7/0045; H02J 7/025; E05D 3/122; G06F 1/1681; G06F 1/1616

USPC ......... 381/334, 387, 386, 332; 16/378, 221; 455/151.2, 3.06, 3.01; 361/679.27, 361/679.28, 679.26
See application file for complete search history.

(56) References Cited

U.S. PATENT DOCUMENTS

| 5,697,125 | A | 12/1997 | Gannon |  |
| 6,385,041 | B1 | 5/2002 | Choi |  |
| 6,567,677 | B1* | 5/2003 | Sokoloff | G06F 1/1616 348/E7.079 |
| 9,271,061 | B1* | 2/2016 | Amores | H04R 1/028 |
| 2004/0157649 | A1* | 8/2004 | Jannard | G02C 11/06 455/569.1 |
| 2004/0212956 | A1 | 10/2004 | Kuivas et al. |  |
| 2006/0238970 | A1* | 10/2006 | Ukonaho | H04M 1/022 361/679.01 |

(Continued)

OTHER PUBLICATIONS

Chiu et al., The Assessment of Stress Analysis for a Notebook's Hinge Stopper Using the FEM Method, Advanced Materials Research vol. 740 (2013) pp. 350-358 (9 pages).

(Continued)

Primary Examiner — Vivian C Chin
Assistant Examiner — Con P Tran
(74) Attorney, Agent, or Firm — Brian J. Pangrle

(57) ABSTRACT

An apparatus can include a first housing that includes a processor and memory accessible by the processor; a second housing; a speaker accessible by the processor; and a hinge assembly that rotatably couples the first housing and the second housing where the first housing and the second housing include a 0 degree angle of rotation, closed orientation and a 360 degree angle of rotation, tablet orientation and where the hinge assembly includes an opening for the speaker that rotates responsive to rotation of the first housing and the second housing via the hinge assembly.

19 Claims, 12 Drawing Sheets

(56) References Cited

U.S. PATENT DOCUMENTS

| | | | |
|---|---|---|---|
| 2008/0284295 A1 | 11/2008 | Lai et al. | |
| 2012/0147535 A1* | 6/2012 | Ahn | G06F 1/1641 |
| | | | 361/679.01 |
| 2012/0275636 A1* | 11/2012 | Vissia | H04R 1/028 |
| | | | 381/387 |
| 2013/0170124 A1* | 7/2013 | Pan | H05K 5/0226 |
| | | | 361/679.08 |
| 2016/0012686 A1* | 1/2016 | Kuscher | G08B 5/36 |
| | | | 704/251 |
| 2016/0070310 A1 | 3/2016 | Holung et al. | |
| 2016/0275648 A1* | 9/2016 | Honda | G06F 3/16 |
| 2017/0192467 A1 | 7/2017 | Holung et al. | |

OTHER PUBLICATIONS

Advanex Europe, Brochure (2013) (16 pages).
Billings, Reell Precision Manufacturing, Positioning with Constant Torque Friction Hinges (2003) (7 pages).
Ergotron White Paper, Comfortable Portable Computing: The Ergonomic Equation (2008) (19 pages).
Lenovo Yoga 720, User Guide, First Edition, Jan. 2017 (40 pages).

\* cited by examiner

US 10,425,711 B2

ROTATING SPEAKER

TECHNICAL FIELD

Subject matter disclosed herein generally relates to technology for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

An apparatus can include a first housing that includes a processor and memory accessible by the processor; a second housing; a speaker accessible by the processor; and a hinge assembly that rotatably couples the first housing and the second housing where the first housing and the second housing include a 0 degree angle of rotation, closed orientation and a 360 degree angle of rotation, tablet orientation and where the hinge assembly includes an opening for the speaker that rotates responsive to rotation of the first housing and the second housing via the hinge assembly. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
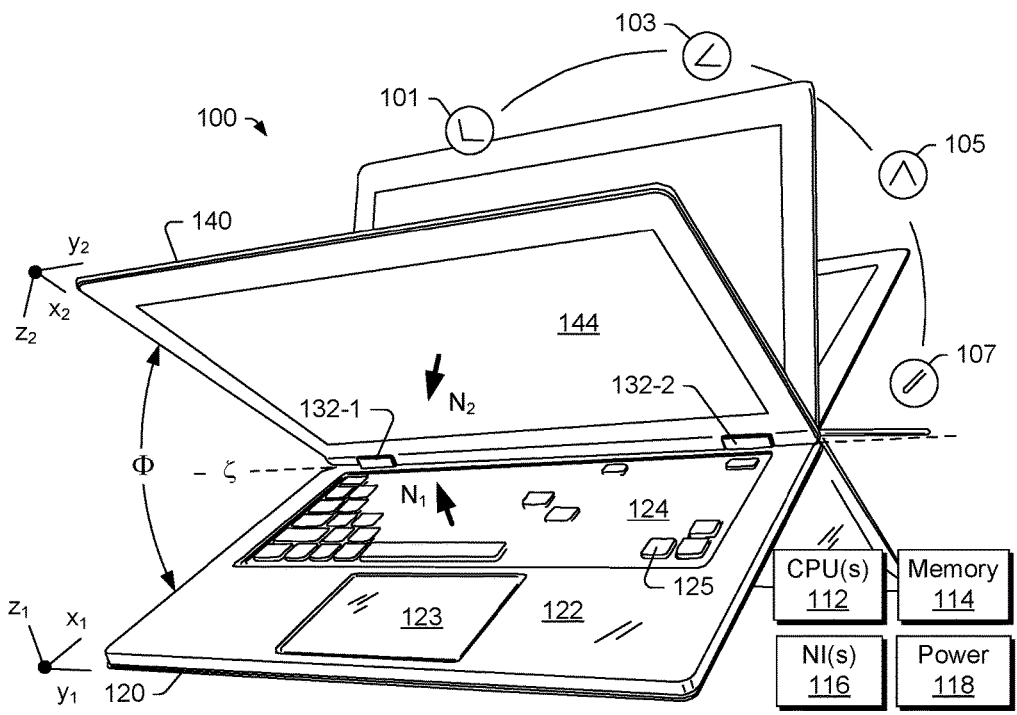
FIG. 1 is a diagram of an example of a system.
Figure 1:
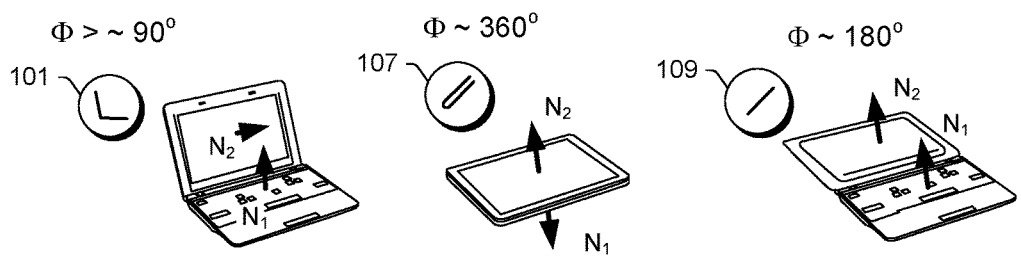

FIG. 1 shows an example of a system 100 that includes a keyboard housing 120 and a display housing 140 that are pivotable with respect to each other via movement about one or more hinges 132-1 and 132-2 (e.g., hinge assemblies).

The system 100 may be a device such as, for example, a computing device (e.g., an information handling device).

As an example, the system 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle Φ is about 0 degrees), the vectors $N_1$ and $N_2$ would be pointing toward each other.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Figure 2:
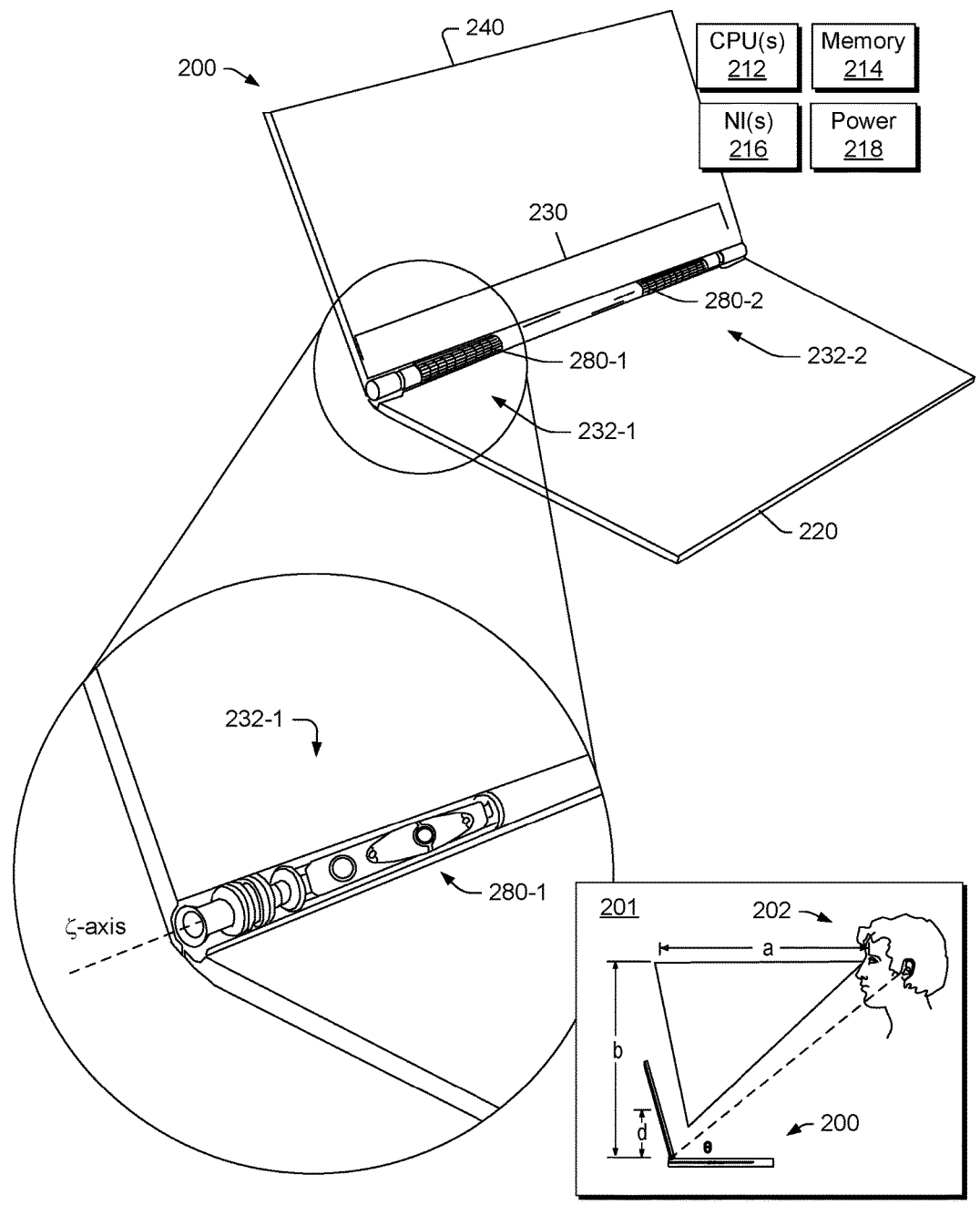
FIG. 2 is a series of diagrams of an example of a system.

FIG. 2 shows an example of a system 200 that can be an apparatus that includes a first housing 220 and a second housing 240. FIG. 2 also shows an example of an ergonomic diagram 201 that includes an arrangement of a user 202 and the system 200. In the ergonomic diagram 201, a dimension "a" is an approximate viewing distance, which may be about 50 cm and a dimension "b" is an approximate eye to elbow distance, which depends on individual body dimensions and position. As shown in the ergonomic diagram 201, the user's ear is at a distance of about the "a" dimension plus several centimeters while being at a slightly lesser angle with respect to horizontal, labeled Θ in the ergonomic diagram 201, which is at approximately 40 degrees. In the example ergonomic diagram 201, the user's head may tilt, for example, the user may tilt his head downward slightly to provide a more suitable viewing angle of a display in the second housing 240. Such tilting of the head may not substantially alter ear position (e.g., ear angle may remain substantially the same).

As an example, the system 200 may include one or more processors 212, memory 214 (e.g., one or more memory devices), one or more network interfaces 216, and one or more power cells 218. Such components may be, for example, housed with the first housing 220, the second housing 240, or the keyboard housing 220 and the display housing 240.

In the example of FIG. 2, the system 200 includes a hinge assembly 230 that includes one or more hinges 232-1 and 232-2, which can be assemblies (e.g., sub-assemblies of the hinge assembly 230). As shown, the system 200 includes one or more speakers 280-1 and 280-2 that can be accessible by the processor 212. In the example of FIG. 2, the hinge assembly 230 rotatably couples the first housing 220 and the second housing 240 where the first housing 220 and the second housing 240 can include a 0 degree angle of rotation, closed orientation and a 360 degree angle of rotation, tablet orientation. The hinge assembly 230 can include an opening or openings for the one or more speakers 280-1 and 280-2 that rotate responsive to rotation of the first housing 220 and the second housing 240 via the hinge assembly 230. In such an example, the openings can be speaker openings, which may be passages for air that is driven by a diaphragm of a speaker or speakers or which may be openings of a diaphragm of a speaker (e.g., a perimeter of a diaphragm).

As an example, a speaker can be a loudspeaker that is an electroacoustic transducer that converts an electrical audio signal into a corresponding sound. A dynamic speaker, a type of loudspeaker, can produce sound from an electrical signal. For example, when an alternating current electrical audio signal is applied to a coil of wire suspended in a gap between poles of a magnet, the coil is forced to move back and forth due to Faraday's law of induction, which causes a diaphragm (e.g., conically shaped, flat shaped, etc.) attached to the coil to move back and forth, pushing on air to create sound waves. One or more other types of electroacoustic devices may be utilized as a loudspeaker. As an example, an audio power amplifier may amplify a sound signal before the signal is transmitted to a speaker. As an example, an audio chip may be utilized that includes circuitry for processing and amplifying sound signals (e.g., from digital files, digital data streams, etc.).

As an example, a piezoelectric speaker is a type of loudspeaker that uses the piezoelectric effect for generating sound. An initial mechanical motion can be created by applying a voltage to a piezoelectric material where the motion can be converted into audible sound, for example, using one or more diaphragms, resonators, etc. As an example, a piezoelectric speaker may be connected directly to a TTL output. As an example, a speaker may operate in a range of frequencies, for example, from about 1 Hz to about 30 kHz or more. As an example, a speaker may be operable in a range of frequencies that fall within a range that corresponds approximately to human hearing (e.g., about 20 Hz to about 20,000 kHz).

In the system 200, the speakers 280-1 and 280-2 being shown, for example, within the hinge assembly 230, can help to reduce space and part requirements for a housing such as the first housing 220 or the second housing 240.

In the example system 200, the speakers 280-1 and 280-2 can be directed toward a user's head; whereas, for a speaker or speakers in the first housing 220, it or they may be directed perpendicular to the first housing 220. For example, where the first housing 220 is a keyboard housing with a keyboard that is positioned on a horizontal surface such as a table or a desk as may be the case for the system 200 as shown in the ergonomic diagram 201, speakers therein may have openings that are directed perpendicular to the keyboard, which can be substantially perpendicular to the horizontal surface (e.g., where Θ is approximately 90 degrees). Where such speakers are upwardly directed (e.g., at approximately 90 degrees from horizontal), they may distribute sound less directly toward a user's head where, for example, a user's ears may be at about 40 degrees as shown in the ergonomic diagram 201. Depending on arrangement of a user with respect to a system, a user's ears may be at an angle in a range of about 20 degrees to about 70 degrees as measured from horizontal.

As an example, where a system includes rotatable speakers (e.g., rotatable speaker openings), sound may be directed more particularly at a user's ears. As an example, the width from ear to ear of a human head may be approximately 20 cm. As an example, a system can include a left speaker and a right speaker where the left and right speakers are spaced apart from each other by approximately 20 cm or more. In such an example, the system can include rotatable left and right speakers, which may be rotatable via a common rotation mechanism or two separate rotation mechanisms. As an example, where a system is a clamshell system such as a clamshell computer (e.g., laptop or notebook computer), in an open orientation with an angle of about 80 degrees to about 130 degrees between a display housing and a keyboard housing, one or more speakers of the system may be rotatable and directed at an angle of about 20 degrees to about 70 degrees. For example, consider the arrangement in the ergonomic diagram 201 where the speakers 280-1 and 280-2 of the system 200 may be directed at about 40 degrees when the second housing 240 (e.g., a display housing) is at an angle of about 105 degrees with respect to the first housing 220 (e.g., a keyboard housing).

As an example, where rotatable speakers of a system are directed more particularly toward a user's ears, a lesser amplification may be utilized for suitable listening. Further, with lesser amplification, there may be less distraction to others that are proximate to the system. As an example, a first housing and a second housing can include surfaces that can be sound wave boundary surfaces. For example, in the ergonomic diagram 201, the first and second housings 220 and 240 can help direct sound from the rotatable speakers 280-1 and 280-2 and/or otherwise help to limit distribution of sound waves in directions other than a general direction of a user.

As mentioned, where one or more speakers or speaker openings are in a hinge assembly, such an arrangement can free-up space in housing or housings for one or more other components and/or allow for one or more housings to be reduced in size.

As an example, a speaker can be inside hinge assembly of a laptop or a tablet accessory. As an example, where two hinges are present, a small speaker may be positioned in each hinge or, for example, where a laptop has one single hinge that stretches the length of the machine there may be several speakers along the hinge. As electrical connections, various hinges or hinge assemblies include electronics/wires running therethrough. As an example, a hinge assembly can include one or more speaker grills that are fit to the hinge assembly. As an example, speakers can be hidden (e.g., protected, etc.) until opening of a laptop. As an example, one or more portions of a hinge or hinge assembly can rotate and aim a speaker or speakers (e.g., speaker opening or openings) to direct sound more particularly towards a user.

Figure 3:
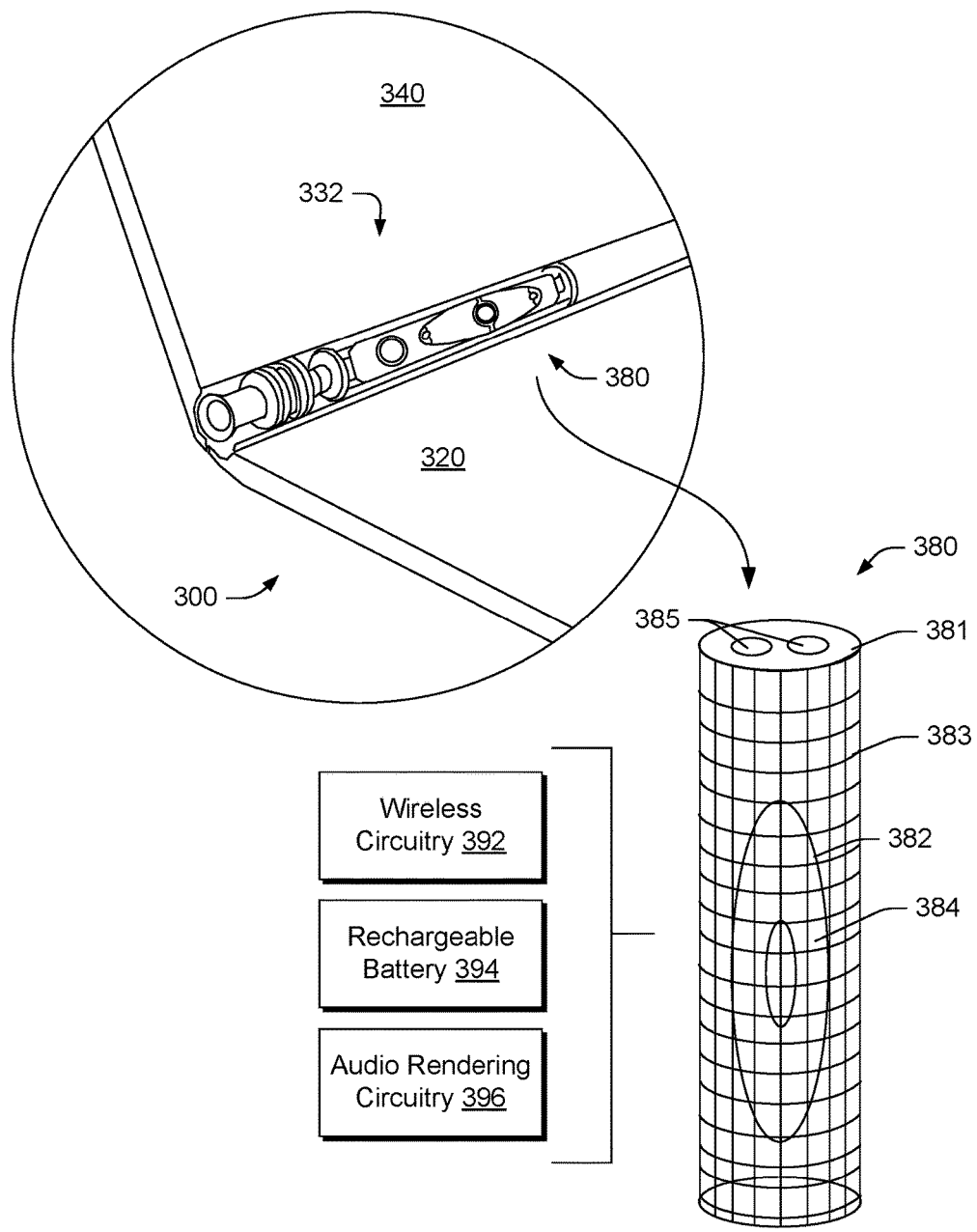
FIG. 3 is a series of diagrams of an example of a system.

FIG. 3 shows an example of a portion of a system 300 that includes a first housing 320, a second housing 340, a hinge 332 and a speaker 380. As shown, the speaker 380 may be removable from the system 300. The speaker 380 can include a speaker housing 381 that includes a speaker opening 382 as associated with a driver (e.g., electroacoustic transducer of a loudspeaker) actuated diaphragm 384 and an optional grill 383, which may be provided with openings for passage of sound waves generated by movement of the diaphragm 384. As shown, the speaker 380 can include one or more electrical contacts 385, which may provide for receipt of power and/or audio signals.

As an example, a grill for a speaker (e.g., a speaker grill) can be part of a speaker housing (see, e.g., the speaker housing 381) or a separate cover that can be operatively coupled to a hinge assembly (see, e.g., the hinge assembly 332). A grill may be made of a material or materials such as, for example, one or more of metal, plastic and leather. As an example, a grill may include a frame and a material that is carried by the frame. For example, consider a relatively rigid frame that is covered with a mesh, which may be a metal mesh, a plastic mesh, a fiber mesh, a leather mesh, etc. As an example, a mesh can be a material that includes one or more openings such that acoustic energy can pass through the one or more openings.

As an example, the speaker 380, which can be rotatable in the system 300, can include wireless circuitry 392, a rechargeable battery 394 and audio rendering circuitry 396. In such an example, the system 300 can include wireless circuitry that can transmit audio signals to the speaker 380 where power from the rechargeable battery 394 can operate the wireless circuitry 392 and the audio rendering circuitry 396 such that the speaker 380 can receive and render audio signals. As an example, the speaker 380 may optionally include memory that can store audio information (e.g., one or more audio files). In such an example, the speaker 380 may be a portable audio rendering device. For example, the speaker 380 may include a button or other type of actuator that when actuated causes information stored in memory to be processed by the audio rendering circuitry to produce sound from the speaker 380.

As an example, a rechargeable, wireless speaker can include a tubular housing that includes a longitudinal axis and a maximum axial cross-sectional dimension less than approximately 3 centimeters; a rechargeable battery disposed in the tubular housing; a driver electrically coupled to the rechargeable battery and disposed within the tubular housing; a diaphragm coupled to the driver and supported by the tubular housing; and wireless circuitry electrically coupled to the rechargeable battery and the driver. In such an example, the diaphragm can include a diaphragm axis that is directed radially outwardly from the longitudinal axis of the tubular housing. As an example, a diaphragm axis can be directed axially outwardly from the longitudinal axis of the tubular housing. For example, a diaphragm may be positioned at an end of a tubular housing.

Figure 4:
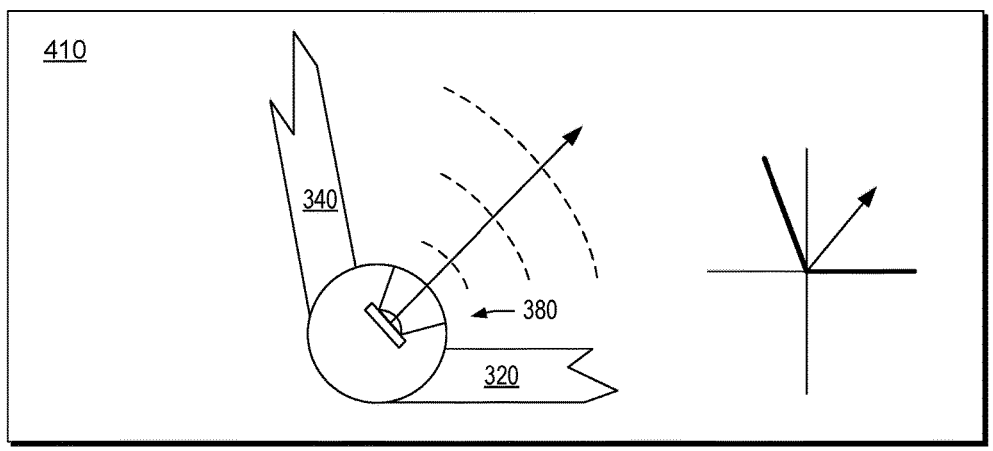
FIG. 4 is a series of diagrams of an example of a method.
Figure 4:
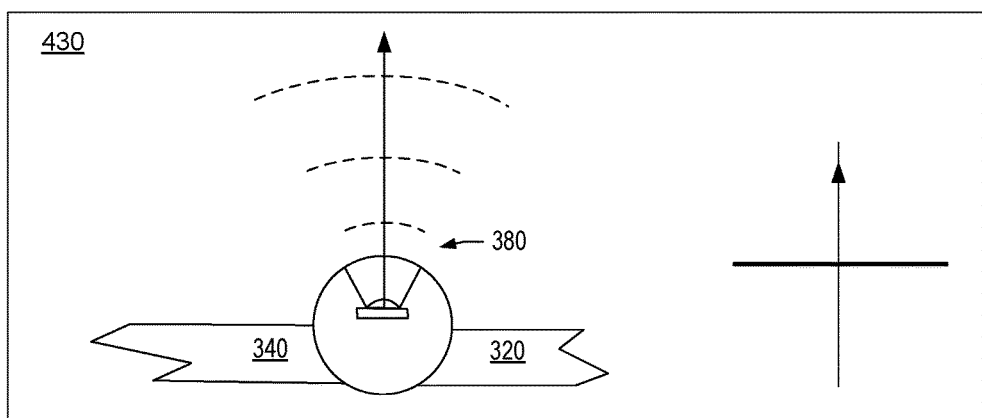
Figure 4:
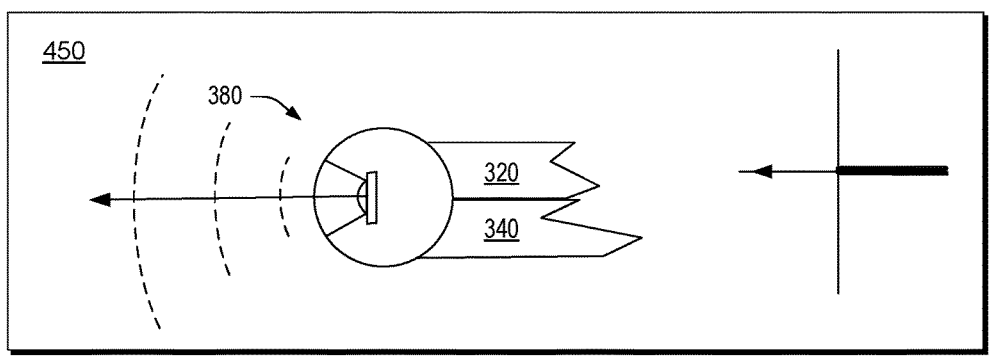

FIG. 4 shows an example of a method 400 that includes blocks 410, 430 and 450 that include graphical representations of the system 300 of FIG. 3. As shown in the block 410, the housings 320 and 340 may be oriented at an angle less than approximately 180 degrees where the speaker 380 has an outwardly directed normal axis (e.g., a radial axis to a longitudinal axis of the speaker 380). In the block 430, the housings 320 and 340 are in a flat orientation where an angle therebetween is approximately 180 degrees and where the outwardly directed axis of the speaker 380 is at approximately 90 degrees. In the block 450, the housings 320 and 340 are in a tablet orientation where an angle therebetween is approximately 360 degrees and where the outwardly directed axis of the speaker 380 is at approximately 180 degrees. In such an example, whether the tablet orientation of the system 300 corresponds to the first housing 320 resting on a surface or the second housing 340 resting on a surface, the speaker 380 will not be blocked by the surface (e.g., a table or desk).

Figure 5:
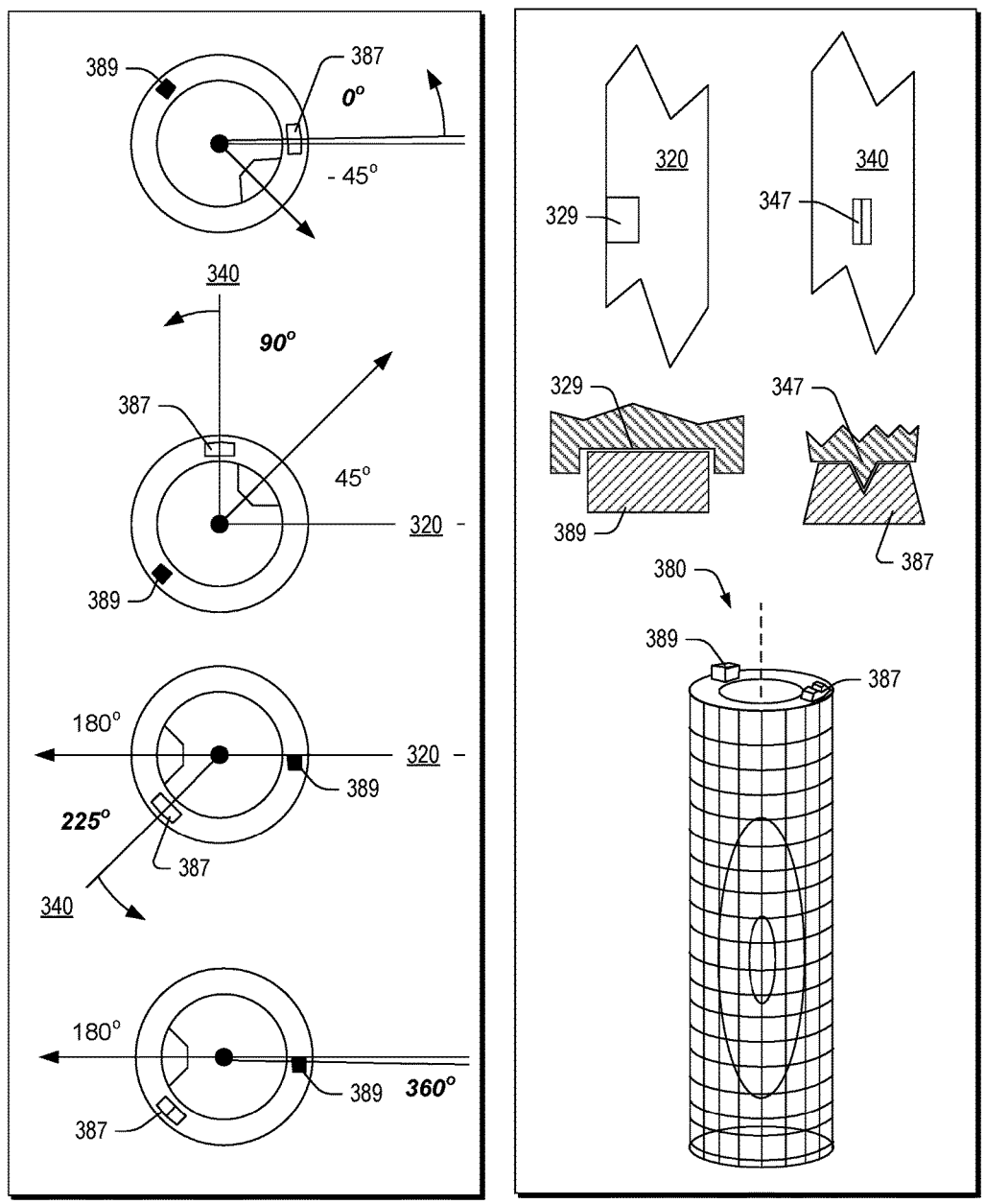
FIG. 5 is a series of diagrams of an example of a rotatable speaker.

FIG. 5 shows an example mechanism for rotating a speaker opening. As shown, the mechanism includes key and keyway features that may be part of the speaker 380 and part of the first housing 320 and part of the second housing 340. In the example of FIG. 5, the speaker 380 can include a keyway feature 387 and a key feature 389 and the first housing 320 can include a keyway feature 329 and the second housing 340 can include a key feature 347; noting that features may be reversed, etc.

As shown in FIG. 5, the key 347 can engage the keyway 387 and the key 389 can engage the keyway 329. In such an example, the key 389 can be a stop that limits rotation of the speaker 380 once the key 389 is engage in the keyway 329 of the first housing 320 (e.g., a stop surface).

As shown in a series of diagrams of FIG. 5, the second housing 340 is rotated from approximately 0 degrees to approximately 360 degrees. Over the range of 0 degrees to approximately 225 degrees, the key 347 is engaged with the keyway 387 such that the speaker 380 rotates (e.g., about a longitudinal axis). At approximately 225 degrees, the key 389 engages the keyway 329, which limits further rotation of the speaker 380. In such an example, as the second housing 340 transitions toward the 360 degree orientation, the key 347 disengages from the keyway 387 upon application of an amount of force, which may be applied by hand upon transitioning the system 300. As the key 389 is engaged by the keyway 329, the applied force allows for disengagement of the key 347 from the keyway 387 such that the speaker 380 does not rotate beyond the 180 degree angle.

As to a transition from the 360 degree orientation of the system 300 back to the 0 degree orientation of the system 300, the key 347 of the second housing 340 will contact the keyway 387 of the speaker 380 and cause it to rotate, whether the key 347 seats against the keyway 387 (e.g., as a feature) or in a groove of the keyway 387, may depend on amount of force applied and/or whether the system 300 is returned to the 0 degree orientation. For example, upon return to the 0 degree orientation, the keyway 387 may abut a stop such that further application of force causes the key 347 to seat in a keyway groove of the keyway 387. In such an example, the speaker 380 is "reset" for being rotated upon opening of the system 300 from the closed, 0 degree orientation.

The example of FIG. 5 demonstrates how a key and keyway pair can be utilized to control rotation of a speaker opening responsive to rotation of a first housing with respect to a second housing.

Figure 6:
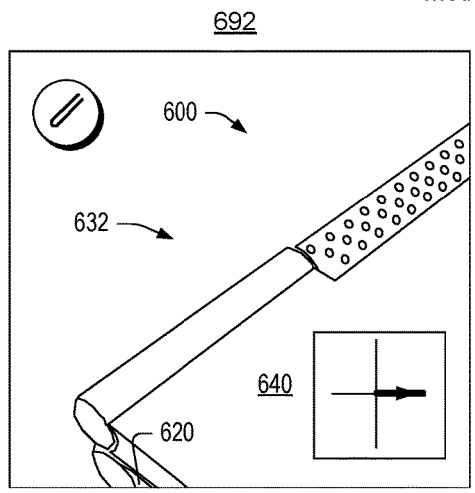
FIG. 6 is a series of diagrams of an example of a system and an example of a method.
Figure 6:
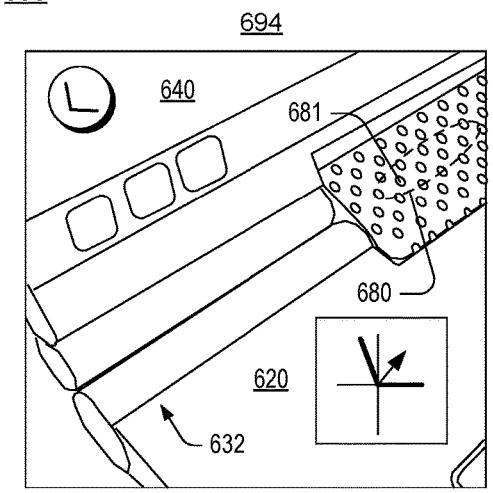
Figure 6:
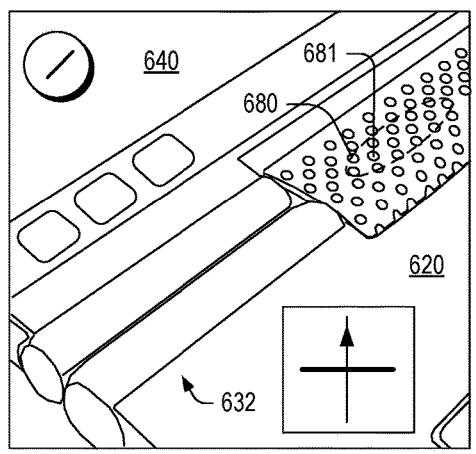
Figure 6:
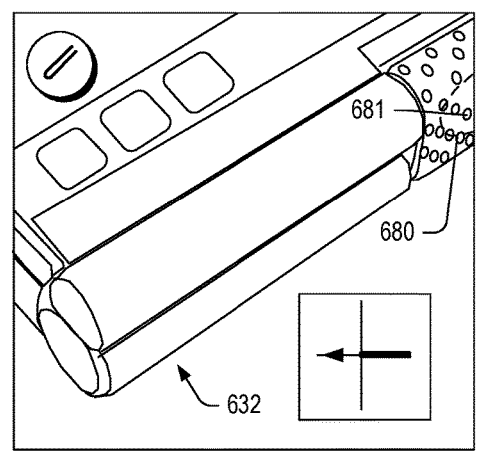

FIG. 6 shows an example of a system 600 and an example of a method 690 with respect to orientations 692, 694, 696 and 698 of the system 600. As shown in FIG. 6, the system includes a first housing 620 and a second housing 640; a speaker 680; and a hinge assembly 632 that rotatably couples the first housing 620 and the second housing 640 where the first housing 620 and the second housing 640 include a 0 degree angle of rotation, closed orientation 692 and a 360 degree angle of rotation, tablet orientation 698 and where the hinge assembly 632 includes an opening 681 for the speaker 680 that rotates responsive to rotation of the first housing 620 and the second housing 640 via the hinge assembly 632.

In the example of FIG. 6, the system 600 may be a computing device such as a laptop computer that can be a clamshell that can be transitioned from one orientation to one or more other orientations. In the example of FIG. 6, the second housing 640 is shown as including a display that can render information such as graphical icons, which may be graphical control icons that can be selectable and actuatable via touch, stylus, voice command, mouse, etc. to cause an operating system executing in the system 600 to perform one or more actions (e.g., execute an application, etc.).

In the example of FIG. 6, the method 690 is illustrated with respect to the orientations 692, 694, 696 and 698, which are shown along with a coordinate system and a vector that approximates a direction of an axis of the speaker 680. As shown, the speaker 680 and its associated opening 681 can transition from having an outwardly directed vector (e.g., cone axis, etc.) at approximately 0 degrees, to approximately 45 degrees, to approximately 90 degrees, to approximately 180 degrees. Such transitions may be achieved using, for example, a dual axle hinge assembly or dual axle hinge assemblies. For example, the hinge assembly 632 can be a dual axle hinge assembly.

In the example of FIG. 6, the speaker 680 is covered by a mesh that includes the opening 681 along with other openings. An opening may be an acoustic energy opening that is disposed in relationship to a driver of a speaker or an acoustic wave guide opening of a speaker. As an example, an opening may be a decorative opening that provides for aesthetics. As an example, an opening may be an air flow opening that provides for flow of air, which may be into and/or out of a housing or housings or, for example, a hinge assembly or hinge assemblies for purposes of cooling and/or heating.

As an example, an opening may be a port for a speaker. For example, a bass reflex speaker can include a port (e.g., a ported or vented chamber, etc.) in an enclosure where the port (e.g., vent) may include a section of tubing or pipe affixed to the port. In such an example, the port can allow a portion of sound generated from a rear side of a diaphragm to increase efficiency, particularly at low frequencies when compared to a sealed backside enclosure.

Figure 7:
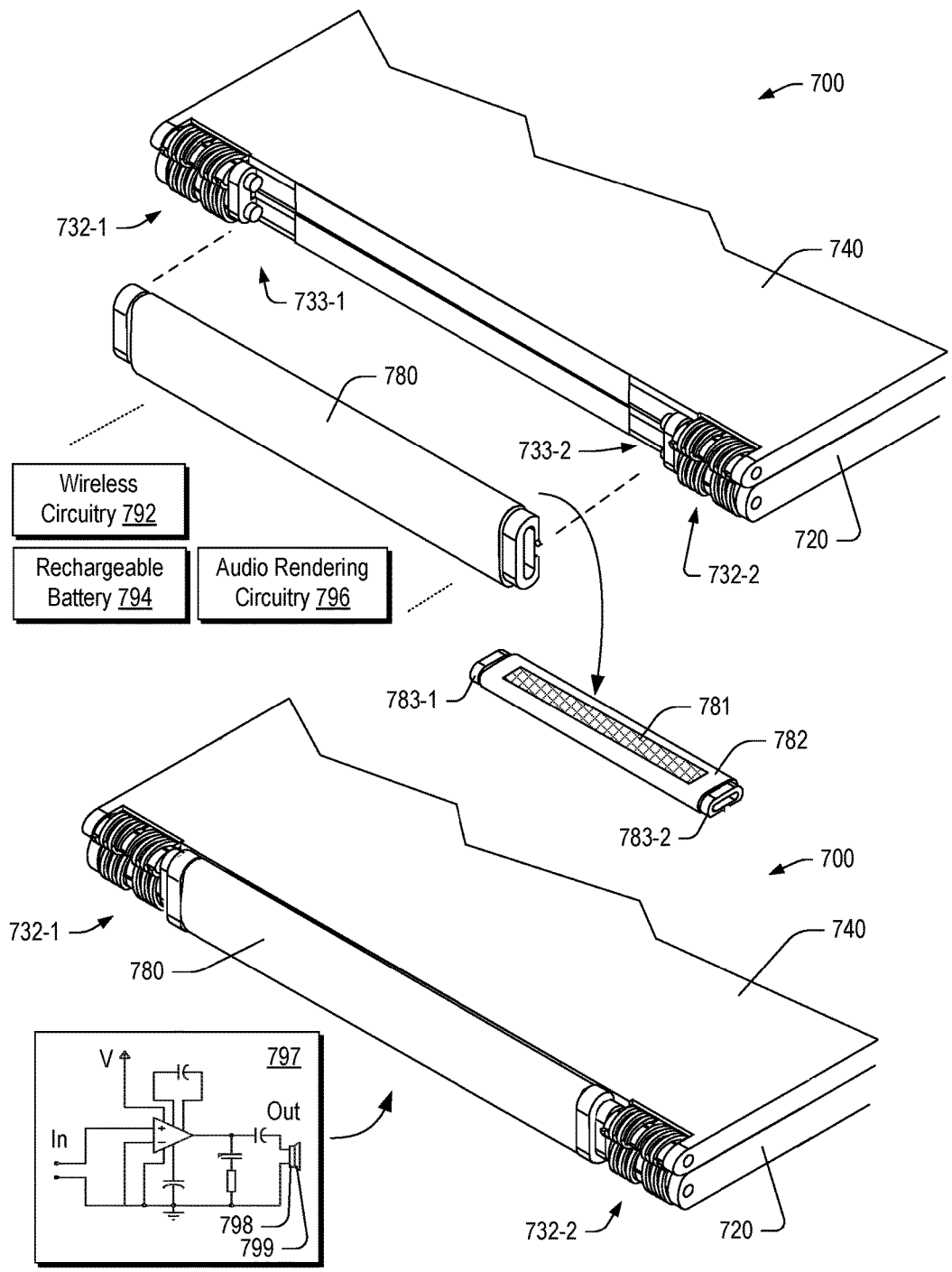
FIG. 7 is a series of diagrams of an example of a system.

FIG. 7 shows an example of a system 700 that includes a first housing 720, a second housing 740, a first dual axle hinge assembly 732-1, a second dual axle hinge assembly 732, and a speaker 780 that can be part of the system 700 and optionally detachable and re-attachable. As an example, a device or a system can include two hinge assemblies where a speaker includes a housing that extends axially between the two hinge assemblies and where the housing includes an opening for the speaker that rotates responsive to rotation of a first housing and a second housing that are operatively coupled via the two hinge assemblies.

As shown in FIG. 7, the speaker 780 can be an assembly that includes a tubular housing 782 that is defined by an axial length and a cross-sectional shape, which may be a polygonal shape (e.g., a rectangular shape, etc.), a curved shaped (e.g., an oval, circular, etc.), or a polygonal and curved shape. The tubular housing 782 can include at least one opening 781, which may be defined by a mesh of the tubular housing 782 and/or attached to the tubular housing 782. The speaker 780 can be an assembly that includes one or more couplings 783-1 and 783-2, which may be operatively coupled to couplings 733-1 and 733-2 of the system 700.

The speaker 780 can include at least one driver that is operatively coupled to circuitry such that electrical signals can be converted into acoustic waves. FIG. 7 shows an example of circuitry 797 that may be included in the system 700 where signals can be received as input that can be processed to cause a driver to generate output. As an example, the circuitry 797 can be included in one or more of the first housing 720, the second housing 740 and the speaker 780 and optionally as one or more instances. As an example, the circuitry 797 may be powered by one or more batteries, power circuits, etc. and the circuitry 797 may be electrically coupled to wired and/or wireless circuitry to receive signals at the input. As an example, the speaker 780 may be a portable BLUETOOTH® wireless speaker. As an example, a speaker can include and/or be operatively coupled to analog and/or digital circuitry.

As an example, the speaker 780 can be a rechargeable, wireless speaker that includes the tubular housing 782 that has a longitudinal axis and a maximum axial cross-sectional dimension less than approximately 3 centimeters; the rechargeable battery 794 disposed in the tubular housing; a driver 798 electrically coupled to the rechargeable battery and disposed within the tubular housing 782; a diaphragm 799 coupled to the driver 798 and supported by the tubular housing 782; and the wireless circuitry 792 electrically coupled to the rechargeable battery 794 and the driver 798.

As an example, the speaker 780 can be an assembly that may include one or more of wireless circuitry 792, a rechargeable battery 794 and audio rendering circuitry 796. For example, the speaker 780 may power wireless circuitry 792 via the rechargeable battery 794 such that information may be received via the wireless circuitry 792 and rendered via the audio rendering circuitry 796 where the audio rendering circuitry 796 is electrically coupled to a driver that can generate acoustic waves. In such an example, the information may be in the form of a file or a stream such as, for example, a broadcast information stream, a digital audio file (e.g., mp3, etc.), etc.

Where the speaker 780 is detachable, it may be operatively coupled to circuitry of the first housing 720 and/or the second housing 740 or optionally circuitry of another device or system (e.g., consider a BLUETOOTH® device). As an example, where the speaker 780 includes the wireless circuitry 792, it may optionally receive information from circuitry of a device or a system, additionally or alternatively to circuitry of the first housing 720 or the second housing 740.

In the example of FIG. 7, the hinge assemblies 732-1 and 732-2 may optionally be covered such that various components thereof may be at least partially concealed.

As an example, the speaker 780 and/or one or more of the hinge assemblies 732-1 and 732-2 may include one or more biased, movable components that can allow for detaching and/or re-attaching the speaker 780. For example, one or more spring-loaded axles and/or one or more spring-loaded sockets may allow for coupling and/or decoupling of the speaker 780 with respect to the hinge assemblies 732-1 and 732-2.

As an example, the speaker 780 may include one or more features of the speaker 680 of the system 600 of FIG. 6.

Figure 8:
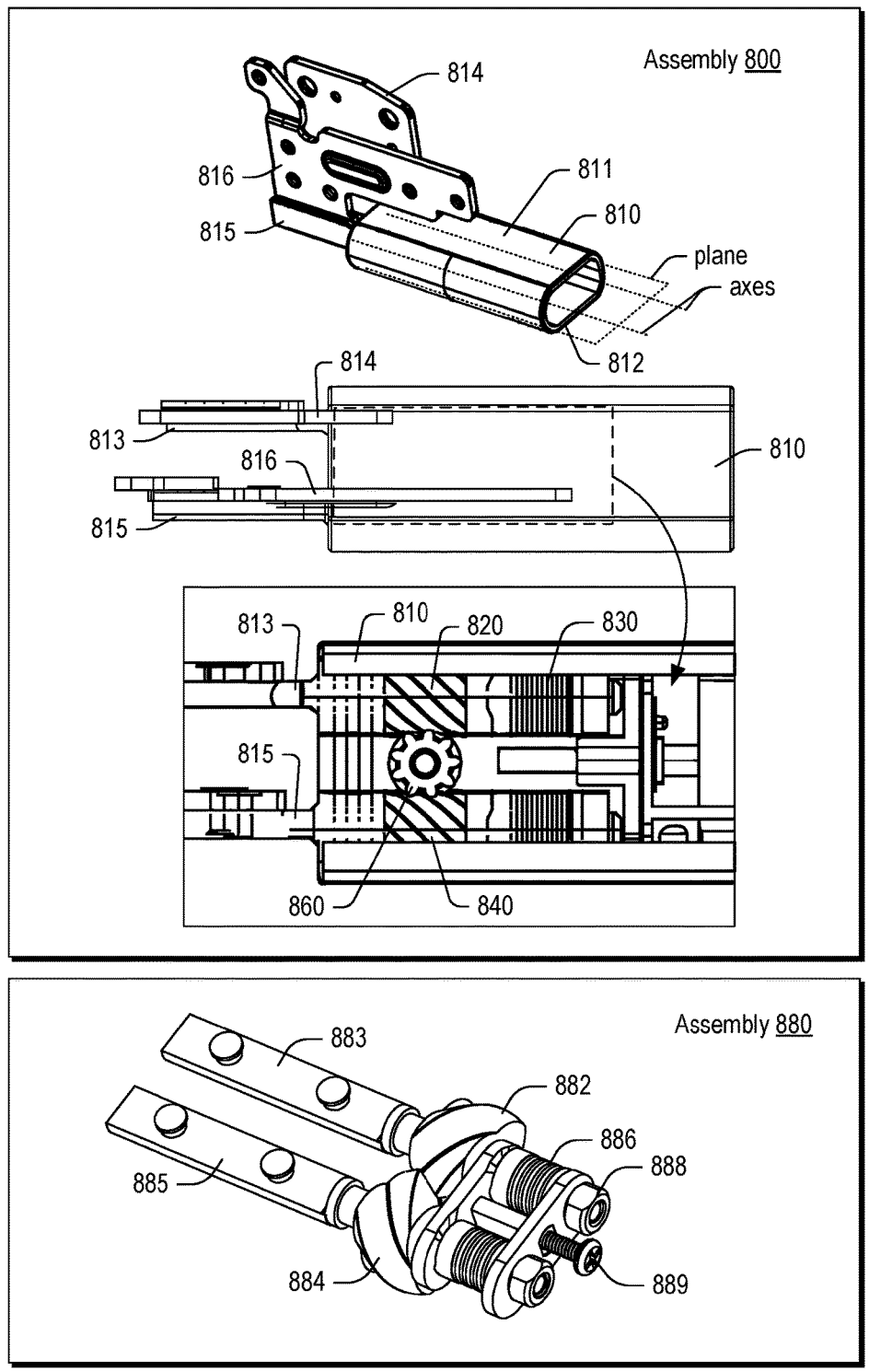
FIG. 8 is a series of diagrams of examples of hinge assemblies.

FIG. 8 shows an example of a hinge assembly 800 and an example of a hinge assembly 880. As shown in FIG. 8, the hinge assembly 800 includes a housing 810 with opposing sides 811 and 812, axles 813 and 815 with corresponding axes, saddles 814 (coupled to the axle 813) and 816 (coupled to the axle 815), gears 820, 840 and 860 and a tensioning mechanism 830 (e.g., a stack of coned washers, etc.). In the hinge assembly 800, the gear 860 is an intermediate gear that is disposed between the gears 820 and 840. As shown, the intermediate gear 860 has a rotational axis that is orthogonal to the rotational axes of the gears 820 and 840. In such an example, the intermediate gear 860 can allow for spacing of axles 813 and 815.

In the example of FIG. 8, the saddles 814 and 816 can be operatively coupled to respective housings of a device such that the housings can be oriented from an approximately 0 degree closed orientation (e.g., a closed clamshell) to an approximately 360 degree open orientation (e.g., a tablet orientation). In such an example, the housing 810 may rotate approximately 180 degrees, for example, from a frontward facing orientation associated with the closed orientation (e.g., a closed clamshell) to a rearward facing orientation associated with the open orientation (e.g., a tablet orientation). The hinge assembly 800 may be utilized in the device 600 of FIG. 6 where, for example, the housing 810 may be a housing of the speaker 680 (e.g., as a speaker assembly) and/or operatively coupled to a housing of the speaker 680. In such an example, the saddles 814 and 816 of the hinge assembly 800 can be operatively coupled to the housings 620 and 640.

As an example, the housing 810 may be an extended housing that can house one or more speakers. As an example, the housing 810 may be a tubular housing that extends a fraction of a width of a computing device such as a laptop computer. For example, the housing 810 may be a housing such as the housing 782 of the system 700 of FIG. 7. In such an example, the housing 810 may be approximately 33 percent or more of the width of the first housing 720 (e.g., consider a housing length along a longitudinal axis of the housing that is about 50 percent or more or, for example, approximately 75 percent, of the width of a laptop computer). As an example, a housing may house speaker components and one or more hinge components, which may be one or more hinge components for one or more hinge assemblies. As an example, a speaker housing may house speaker components and gears of one or more hinge assemblies.

As shown in FIG. 8, the housing 810 can be a cover for various hinge assembly components. As an example, the housing 810 may extend from a left side hinge assembly to a right side hinge assembly of a system to at least in part cover some components of the left side hinge assembly and to at least in part cover some components of the right side hinge assembly. As an example, the housing 810 can include an opening to receive one or more wires, which may be operatively coupled to a speaker or speakers and/or circuitry associated with a speaker or speakers.

In FIG. 8, the hinge assembly 880 includes gears 882 and 884, axles 883 and 885, a tension mechanism 886, nuts 888 and a tensioning component 889. As an example, the hinge assembly 880 may include a housing such as the housing 810, which may be, for example, a housing of a speaker (see, e.g., the housing 782 of the speaker 780 of FIG. 7).

As an example, a hinge assembly can include two or more gears. As an example, a hinge assembly can include two or more axles. As an example, a hinge assembly can include two or more gears and two axles that have rotational axes that are substantially parallel to each other where each of the two axles is operatively coupled to a respective housing of a device (e.g., a display housing and a keyboard housing). Such a device can include a rotatable speaker that is operatively coupled to the hinge assembly and that may be part of a hinge assembly or hinge assemblies.

FIG. 8 shows the hinge assembly 800 as including substantially parallel rotational axes of the two axles 813 and 815 that can define a plane (see dashed lines and labels). As an example, a speaker can include a diaphragm that is directed outwardly from the plane defined by the two axles 813 and 815, for example, in a direction substantially normal to the plane. In such an example, the direction of the speaker can correspond to a vector normal to a plane defined by two parallel axes of a hinge assembly.

In the example hinge assembly 800 of FIG. 8, the housing 810 includes a tubular shape, which may be described as being a flattened tube where the opposing sides 811 and 812 are substantially flat, opposing and parallel sides joined by rounded ends. In such an example, the substantially flat, opposing and parallel sides 811 and 812 can be substantially parallel to either side of a plane defined by the axles 813 and 815. Where the housing 810 is in a stationary coordinate system, the saddles 814 and 816 may be rotated about the respective axes of the axles 813 and 815, for example, from an orientation as shown in FIG. 8 to another orientation where each of the saddles 814 and 816 has been rotated approximately 180 degrees, the saddle 816 being rotated counter-clockwise and the saddle 814 being rotated clockwise when viewing the housing 810 from the open end shown in FIG. 8. In such an example, where the housing 810 is a housing of a speaker (e.g., or speakers), the side 811 of the housing 810 may be oriented in the orientations as shown in FIG. 6 with respect to the first and second housings 620 and 640. In particular, where one of two housings operatively coupled via the hinge assembly 800 may be stationary and the other housing rotated, the side 811 of the housing 810 can rotate and direct an opening for a speaker such that the hinge assembly 800 can include an opening for a speaker that rotates responsive to rotation of housings via the hinge assembly 800. As an example, rotation can be relative rotation, for example, rotation relative to a housing or housings.

As an example, a hinge assembly can be a friction hinge assembly that may be without one or more lock points along its rotation. For example, a hinge assembly can have a variable 360 degree rotation with a set specified torque that meets specification as to ergonomics for a user to easily open and close a system (e.g., a computing device, etc.) while providing for freestanding at one or more angles in a span of approximately 360 degrees. As an example, a housing may include wires, fibers, circuitry, etc. that allows for transmission of power and/or information from a display housing to a keyboard housing and/or vice versa, optionally in a manner that provides for transmission of power and/or information to a speaker or speakers.

Figure 9:
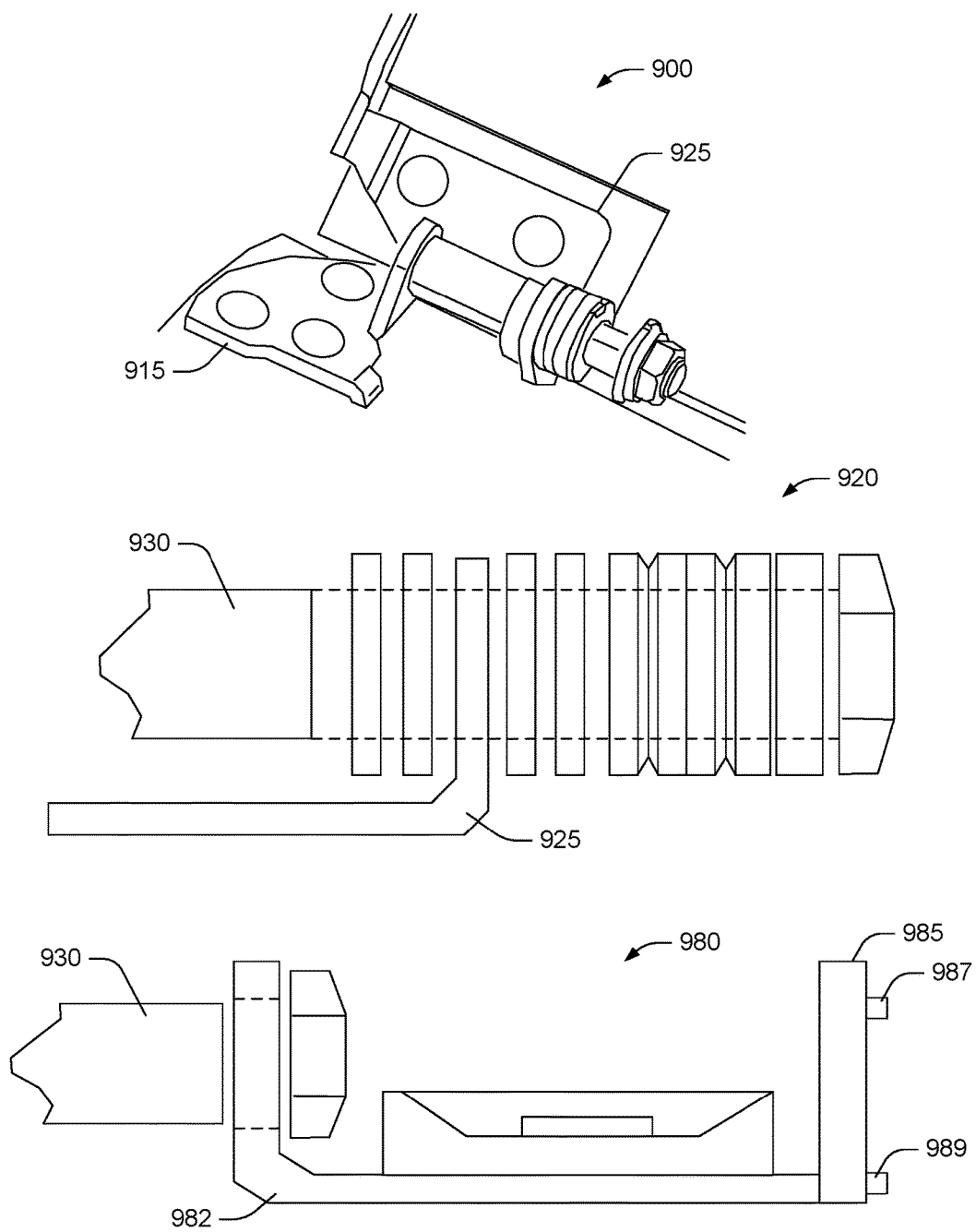
FIG. 9 is a series of diagrams of an example of a hinge assembly.

FIG. 9 shows an example of a hinge assembly 900 that includes a saddle 915 and a saddle 925 with respect to a hinge post 930 and various components 920. The components 920 may include a screw nut, a dowel plate, disk type leaf springs, packing, etc. As shown in FIG. 9, a speaker assembly 980 can include a carrier 982 and an end portion 985 that can include one or more key and/or keyway features 987 and 989 (see, e.g., the example features of FIG. 5). As an example, the hinge assembly 900 may be a friction hinge assembly. As an example, the carrier 982 may be rotatable responsive to engagement of the features 987 and 989 with one or more corresponding features (see, e.g., the example features of FIG. 5). As shown in FIG. 9, the carrier 982 can be supported by the hinge post 930. The carrier 682 may be supported by the hinge post 930 and may be freely rotatable about the hinge post such that features of the end portion 985 determine whether the carrier 982 rotates. As an example, the end portion 985 may engage features of a first housing and/or a second housing. As an example, the end portion 985 may be shaped and/or dimensioned such that engagement can occur with a first housing and/or a second housing.

Figure 10:
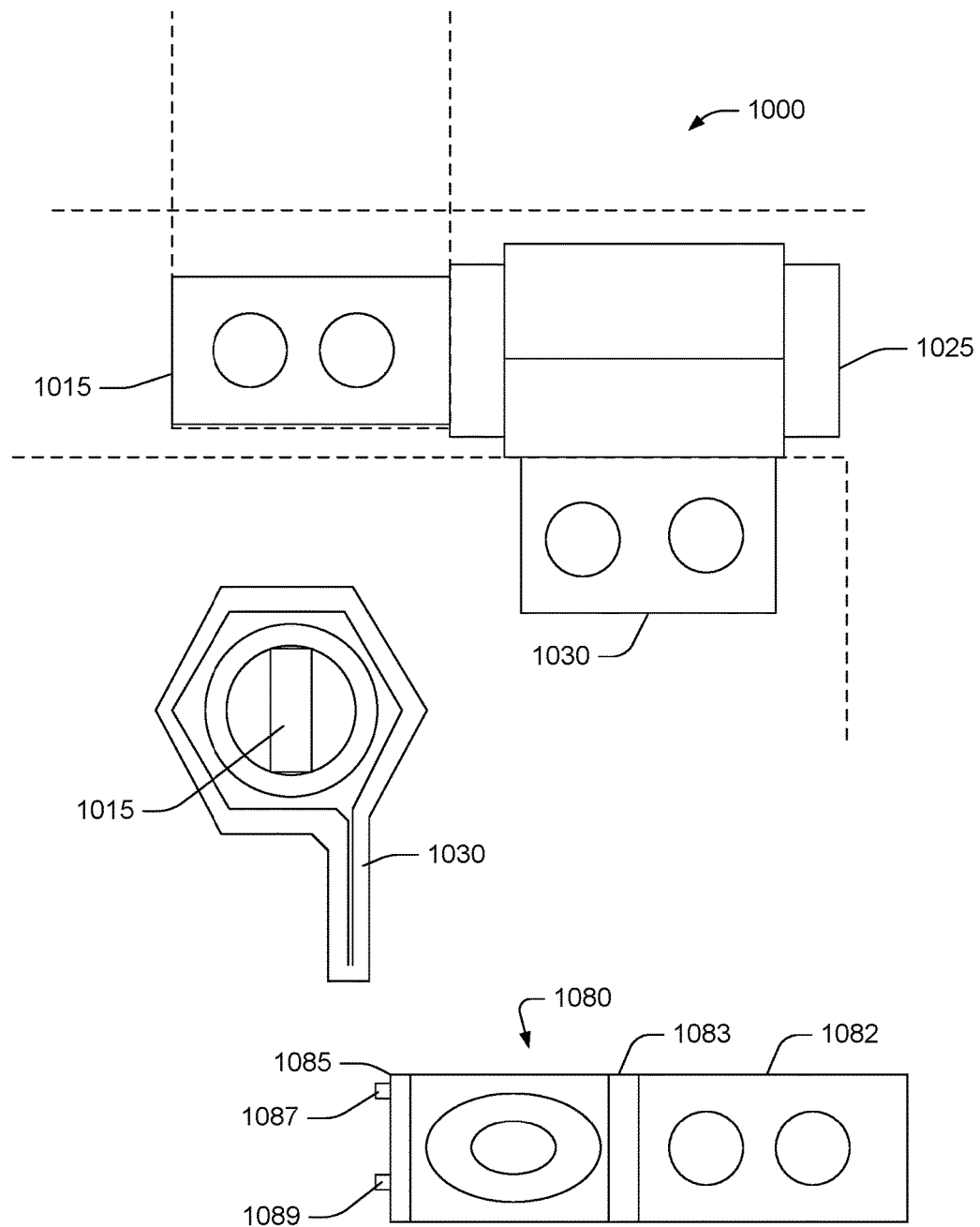
FIG. 10 is a series of diagrams of an example of a hinge assembly.

FIG. 10 shows an example of a hinge assembly 1000 that includes a hinge post 1025 along with connector portions 1015 and 1030. As an example, a speaker assembly 1080 can include a connector portion 1082 that can be coupled to the connector portion 1015 of the hinge assembly 1000 such that the speaker assembly 1080 is supported by the hinge post 1025. As to rotation of a speaker of the speaker assembly 1080 as carried by a speaker carrying portion of the speaker assembly, a joint 1083 may be operatively coupled to the connector portion 1082 to decouple rotation of the connector portion 1082 from the speaker carrying portion of the speaker assembly 1080. In such an example, rotation of the hinge post 1025 and the connector portion 1015 may optionally be decoupled from rotation of the speaker carrying portion of the speaker assembly 1080. In such an example, the speaker assembly 1080 can include a rotation feature portion 1085 that includes features 1087 and 1089, which may be, for example, key and/or keyway features (see, e.g., the example of FIG. 5).

As an example, the speaker assembly 1080 may be detachable from the connector portion 1015. For example, consider the connector portion 1015 and the connector portion 1082 being magnetically connectable (e.g., using one or more permanent magnets). In such an example, a user may pull the speaker assembly 1080 out of a system. As an example, the speaker assembly 1080 may include one or more features of the speaker 380 of FIG. 3.

As an example, a speaker assembly may be magnetically coupled to a hinge assembly via a magnet of the speaker assembly, which may be a magnet associated with an electroacoustic transducer of the speaker assembly. For example, a speaker assembly (e.g., or a speaker) can include a permanent magnet that provides for operation of a coil to drive a diaphragm. In such an example, a hinge assembly can include a ferromagnetic component that can seat the speaker assembly using attractive magnetic force. In such an example, the speaker assembly may be removable from the hinge assembly and insertable into the hinge assembly in a detachable and re-attachable manner.

In the example of FIG. 10, the speaker assembly 1080 can include a permanent magnet where the magnetic field may extend to the connector portion 1082, which may be a ferromagnetic material. In the example of FIG. 10, the speaker assembly 1080 can include a permanent magnet where the magnetic field may extend to the joint 1083, which may be a separable joint that joins the speaker carrying portion to the connector portion 1082. In such an example, a user may (e.g., via a finger, fingernail, etc.) remove the speaker carrying portion of the speaker assembly 1080 from a hinge assembly of a system and return the speaker carrying portion of the speaker assembly 1080 to the hinge assembly of the system where the speaker carrying portion of the speaker assembly 1080 is operatively coupled to the hinge assembly at least in part via magnetic force. As mentioned, such magnet force may be provided by a permanent magnet of a speaker of the speaker assembly 1080.

Figure 11:
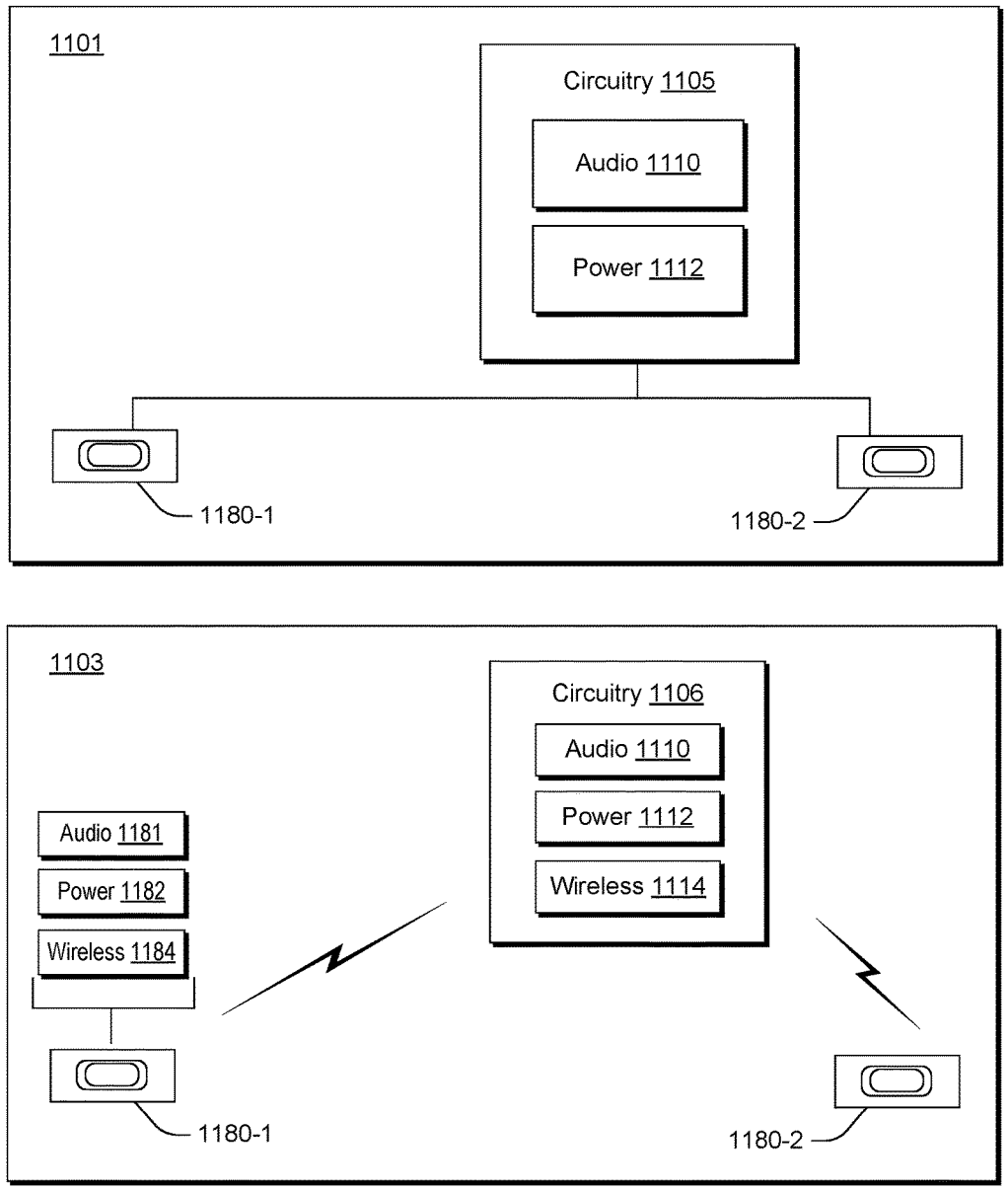
FIG. 11 is a series of diagrams of circuitry.

FIG. 11 shows an example arrangement 1101 and an example arrangement 1103 of various circuitry. In the example arrangement 1101, a system can include circuitry 1105 that includes audio circuitry 1110 and power circuitry 1112 that may be wired to a first speaker 1180-1 and a second speaker 1180-2. In the example arrangement 1103, a system can include circuitry 1106 that includes audio circuitry 1110 and power circuitry 1112 as well as wireless circuitry 1114. Such circuitry may optionally be wired to the first speaker 1180-1 and the second speaker 1180-2. In the example arrangement 1103, the speakers 1180-1 and 1180-2 may include audio circuitry 1181, power circuitry 1182 and wireless circuitry 1184. As an example, the speakers 1180-1 and 1180-2 may be operatively coupled. As an example, the speakers 1180-1 and 1180-2 may be within a common housing such that they may be removed from a system as a unit. For example, consider a cylindrical housing that sits between a left hinge and a right hinge where the cylindrical housing may be a rotatable housing that can rotate the speakers. In such an example, the cylindrical housing may be removable and insertable into a hinge assembly that includes at least one of the left hinge and the right hinge (e.g., as support for the cylindrical housing, directly or indirectly) where the hinge assembly allows for orienting a first housing and a second housing that are operatively coupled via the hinge assembly.

An apparatus can include a first housing that includes a processor and memory accessible by the processor; a second housing; a speaker accessible by the processor; and a hinge assembly that rotatably couples the first housing and the second housing where the first housing and the second housing include a 0 degree angle of rotation, closed orientation and a 360 degree angle of rotation, tablet orientation and where the hinge assembly includes an opening for the speaker that rotates responsive to rotation of the first housing and the second housing via the hinge assembly. In such an example, in the tablet orientation, the opening for the speaker can be an approximately 180 degree angle of rotation. As an example, a first housing and a second housing can include an approximately 90 degree angle of rotation, notebook orientation where an opening for a speaker has an angle of rotation greater than 20 degrees and less than 70 degrees. In such an example, the opening for the speaker can be at an angle of rotation of approximately 45 degrees.

As an example, a speaker can be disposed in hinge assembly. In such an example, the speaker can be removable from the hinge assembly. As an example, an apparatus can include a removable speaker where, for example, the removable speaker includes wireless communication circuitry. As an example, a removable speaker can include a battery, which may be, for example, a rechargeable battery. As an example, a hinge assembly of an apparatus can include a battery charger port. As an example, a battery charger port may be contact or contactless (e.g., wireless) for charging a battery of a removable speaker.

As an example, an apparatus can include a first speaker and a first opening for the first speaker and a second speaker and a second opening for the second speaker. Such openings may be part of a hinge assembly.

As an example, a hinge assembly can include a rotatable speaker mount. In such an example, the rotatable speaker mount can include a friction coupling and a stop. In such an example, the stop can limit rotation of the speaker mount at an angle of rotation of approximately 180 degrees.

As an example, a speaker can be carried by a first housing, where a hinge assembly includes an internal opening for the speaker and an acoustic passage and where an opening for the speaker is an external opening of the acoustic passage.

As an example, a speaker can be carried by a second housing, where a hinge assembly includes an internal opening for the speaker and an acoustic passage and where an opening for the speaker is an external opening of the acoustic passage.

As an example, a first housing can be a display housing and/or a second housing can be a keyboard housing. Such housings can include one or more electronic components, which may be operatively coupled to at least one processor, which may be via wire, wires and/or wireless circuitry.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 12:
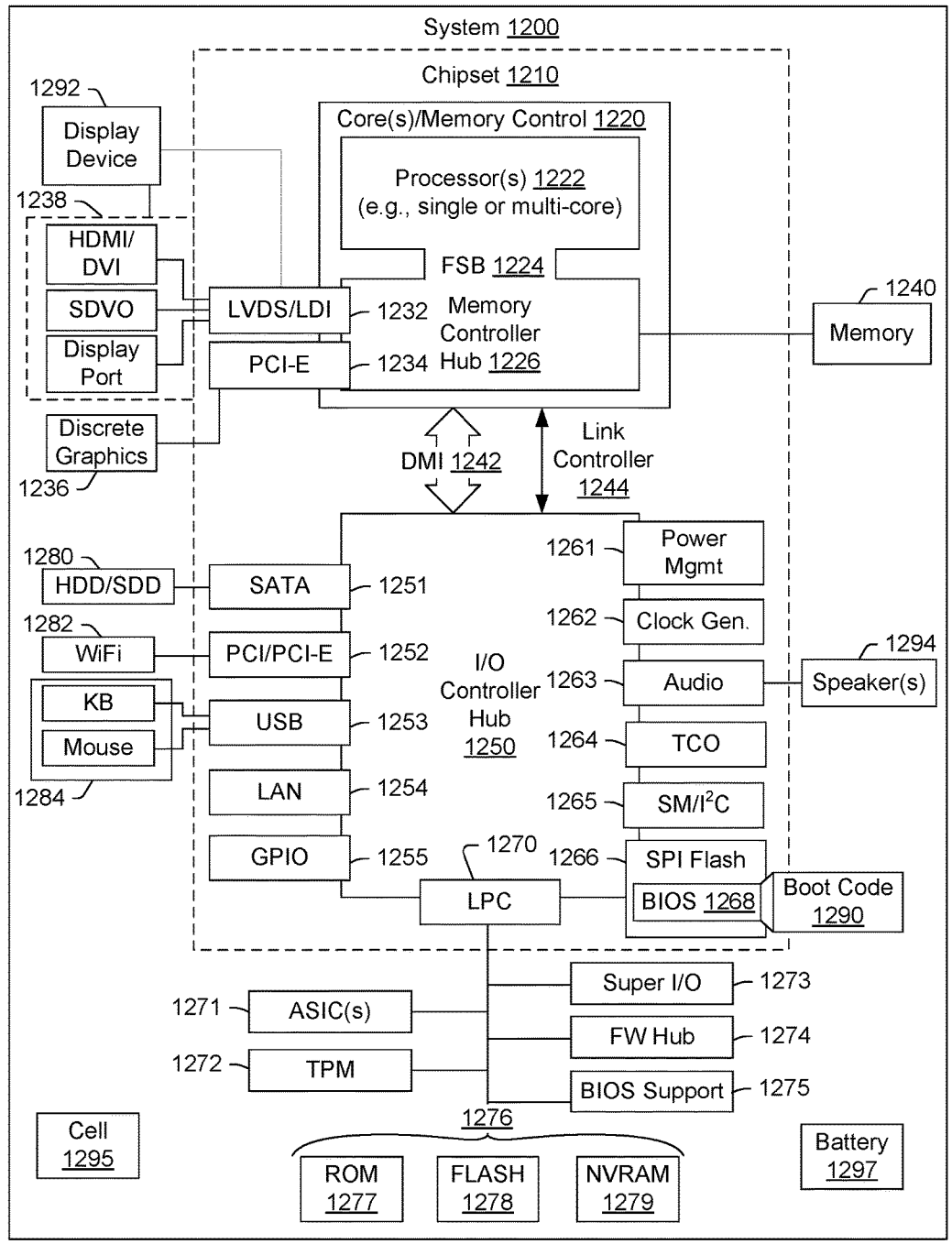
FIG. 12 is a diagram of an example of a system that includes one or more processors.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1200. As an example, a system such as the system 100 of FIG. 1 may include at least some of the features of the system 1200; a system such as the system 200 of FIG. 2 may include at least some of the features of the system 1200; a system such as the system 300 of FIG. 3 may include at least some of the features of the system 1200; a system such as the system 600 of FIG. 6 may include at least some of the features of the system 1200; a system such as the system 700 of FIG. 7 may include at least some of the features of the system 1200; etc.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a first housing that comprises a processor and memory accessible by the processor;
   a second housing;
   a speaker accessible by the processor and disposed in a carrier; and
   a hinge assembly that rotatably couples the first housing and the second housing via two geared, parallel axles that define an axles plane, wherein the carrier is coupled to the hinge assembly, wherein the first housing and the second housing comprise a 0 degree angle of rotation, closed orientation and a 360 degree angle of rotation, tablet orientation, and wherein for a rotational transition of the first housing and the second housing via the hinge assembly from the closed orientation to the tablet orientation, the carrier remains stationary with respect to the axles plane.

2. The apparatus of claim 1 wherein the first housing defines a first plane, wherein the second housing defines a second plane, and wherein, in the tablet orientation, the first and second planes are parallel and the axles plane is orthogonal the first and second planes.

3. The apparatus of claim 1 wherein the first housing and the second housing comprise an approximately 90 degree angle of rotation, notebook orientation wherein the axles plane comprises an angle of rotation greater than 20 degrees and less than 70 degrees.

4. The apparatus of claim 3 wherein the axles plane comprises an angle of rotation of approximately 45 degrees.

5. The apparatus of claim 1 wherein the carrier is removable from the hinge assembly.

6. The apparatus of claim 5 wherein the removable carrier comprises wireless communication circuitry.

7. The apparatus of claim 1 wherein the speaker comprises a first speaker and wherein the carrier comprises a first opening for the first speaker and comprising a second speaker disposed in the carrier and wherein the carrier comprises a second opening for the second speaker.

8. The apparatus of claim 1 comprising two hinge assemblies wherein the carrier extends axially between the two hinge assemblies.

9. The apparatus of claim 1 wherein the hinge assembly comprises an intermediate gear disposed between the two geared, parallel axles.

10. The apparatus of claim 1 wherein the carrier covers gears of the two geared, parallel axles.

11. The apparatus of claim 1 wherein the carrier comprises a tubular shape.

12. The apparatus of claim 1 wherein the carrier comprises a flattened tubular shape.

13. The apparatus of claim 1 wherein the hinge assembly comprises a first rotatable saddle and a second rotatable saddle, wherein the first rotatable saddle is connected to the first housing and a first one of the two geared, parallel axles and the second rotatable saddle is connected to the second housing and a second one of the two geared, parallel axles.

14. The apparatus of claim 13 wherein the axles plane defines a stationary coordinate system and wherein the first and second rotatable saddles rotate with respect to the axles plane.

15. The apparatus of claim 14 wherein the rotational transition of the first housing and the second housing via the hinge assembly from the closed orientation to the tablet orientation rotates each of the saddles approximately 180 degrees.

16. The apparatus of claim 1 comprising a battery disposed in the carrier.

17. The apparatus of claim 16 wherein the battery comprises a rechargeable battery.

18. The apparatus of claim 17 wherein the hinge assembly comprises a battery charger port.

19. An apparatus comprising:
   a first housing that comprises a processor and memory accessible by the processor;
   a second housing;
   a speaker accessible by the processor and disposed in a carrier; and
   a hinge assembly that rotatably couples the first housing and the second housing via two geared, parallel axles that define an axles plane, wherein the carrier is coupled to the hinge assembly, wherein the first housing and the second housing comprise a 0 degree angle of rotation, closed orientation and a 360 degree angle of rotation, tablet orientation, wherein for a rotational transition of the first housing and the second housing via the hinge assembly from the closed orientation to the tablet orientation, the carrier remains stationary with respect to the axles plane, and wherein the first housing and the second housing comprise an approximately 90 degree angle of rotation, notebook orientation wherein the axles plane comprises an angle of rotation greater than 20 degrees and less than 70 degrees.

\* \* \* \* \*